(12) United States Patent
Ochiai

(10) Patent No.: US 6,743,510 B2
(45) Date of Patent: Jun. 1, 2004

(54) COMPOSITION COMPRISING A CATIONIC POLYMERIZATION COMPOUND AND COATING OBTAINED FROM THE SAME

(75) Inventor: Shinsuke Ochiai, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/289,433

(22) Filed: Nov. 7, 2002

(65) Prior Publication Data

US 2003/0134124 A1 Jul. 17, 2003

(30) Foreign Application Priority Data

Nov. 13, 2001 (JP) .................................. 2001-347083
Nov. 13, 2001 (JP) .................................. 2001-347084
Mar. 13, 2002 (JP) .................................. 2002-068264
Mar. 13, 2002 (JP) .................................. 2002-068265

(51) Int. Cl.$^7$ ............................................. B32B 27/38
(52) U.S. Cl. ................ 428/413; 428/500; 523/200; 523/201; 523/434; 523/435; 523/443; 524/789; 524/847; 524/868

(58) Field of Search .................... 428/500; 524/789, 524/847, 868; 523/200, 201, 434, 435, 443; 525/107, 112; 425/413

(56) References Cited

FOREIGN PATENT DOCUMENTS

| JP | 6-157819 A | | 6/1994 |
|---|---|---|---|
| JP | 7-48527 A | | 2/1995 |
| JP | 7-53711 A | | 2/1995 |
| JP | 07048527 | * | 2/1995 |
| JP | 7-133105 A | | 5/1995 |
| JP | 11-29640 A | | 2/1999 |

* cited by examiner

Primary Examiner—Philip Tucker
Assistant Examiner—David E. Aylward
(74) Attorney, Agent, or Firm—Sughrue Mion, PLLC (57) ABSTRACT

A composition comprising a cationic polymerization compound and a porous fine particle, a coating made from the composition and a laminated plate comprising a substrate and the coating are provided. The coating is superior in adhering properties to a substrate and is equipped with an adequate hardness.

28 Claims, 4 Drawing Sheets

COMPOSITION COMPRISING A CATIONIC POLYMERIZATION COMPOUND AND COATING OBTAINED FROM THE SAME

FIELD OF THE INVENTION

The present invention relates to a composition comprising a cationic polymerization compound and a porous fine particle, a coating of the composition and a laminated plate comprising a substrate and the coating.

BACKGROUND OF THE INVENTION

Functional coatings such as a mar resistant coating, an antistatic film, an anti-reflection film and a surface protective film have been conventionally formed and utilized on the surface of transparent substrates such as glass and resin such as an acrylic resin, for a display.

However, conventionally utilized coatings such as an acryl resin coating have different adhering degrees depending on a resin for a substrate onto which the coating is placed. In particular, when a methyl methacrylate-styrene copolymer resin is used for the substrate, the adhering degree of the commonly-used coating tends to be greatly lowered. Further, when the thickness of the coating is thin as about 1am or less, an adequate curing is difficult to be achieved by curing with ultraviolet rays due to the inhibition of polymerization by oxygen. As a result, a coating having sufficient hardness is difficult to be obtained.

SUMMARY OF THE INVENTION

Accordingly, the present inventor has intensively studied in order to develop a material which shows sufficient adhering properties to a substrate, in particular, to a methyl methacrylate-styrene copolymer resin substrate as well as a poly(methyl methacrylate) resin substrate, and adequately cures even when a very thin film is needed. As a result, the present inventor has found that a coating obtained from a composition comprising a cationic polymerization compound and a porous fine particle has sufficient adhering properties to a substrate and adequately cures to provide a thin film having a thickness of 1 μm or less with sufficient hardness. The present invention has been accomplished based on such findings.

The present invention provides a composition comprising a cationic polymerization compound and a porous fine particle. Further, the present invention provides a coating and a paint, each of which is obtained from the composition. Moreover, the present invention provides a laminated plate comprising the coating and a substrate.

DETAILED DESCRIPTION OF THE INVENTION

The present invention provides a composition comprising a cationic polymerization compound and a porous fine particle. A coating obtained by curing the composition may work as a functional layer. When the coating has an appropriate thickness and a refractive index, it may become an anti-reflection layer. In such a coating, porous particles may be dispersed in the cured article of the cationic polymerization compound.

When a porous fine particle and an oxetane compound, which is one of cationic polymerization compound, exist in a composition, a coating obtained by curing the composition has improved adhering properties to a substrate. In particular, when a methyl methacrylate-styrene copolymer resin is used for the substrate, the improvement is remarkable. A coating comprising an oxetane compound with no porous fine particle has an inadequate adhering property with the substrate. When a coating which works as an anti-reflection layer is needed, a porous fine particle having a low refractive index is preferably utilized.

A cationic polymerization compound is a compound which is able to be cured by cationic polymerization. Examples of the cationic polymerization compound include an oxetane compound, an epoxy compound, a mixture thereof and the like.

An oxetane compound is a compound which has at least one oxetane ring in its molecule. A preferable oxetane compound, which is not limited in the present invention, may be a compound which can be represented by formulae (I) to (III) below. In the present invention, compound (III) is utilized as one of the oxetane compounds which has a silyl group in its molecule.

In formulae (I) to (III), $R^1$ represents a hydrogen atom, a fluorine atom, an alkyl group, a fluoroalkyl group, an allyl group, an aryl group or a furyl group, m represents an integer of 1 to 4, Z represents an oxygen atom or a sulfur atom, $R^2$ represents a monovalent to tetra-valent organic group in accordance with the value of m, n represents an integer of 1 to 5, p represents an integer of 0 to 2, $R^3$ represents a hydrogen atom or a monovalent inactive organic group, and $R^4$ represents a functional group which can be hydrolyzed.

When $R^1$ is an alkyl group in formulae (I) to (III), $R^1$ has the carbon number of about one to six, and may be a methyl group, an ethyl group, a propyl group, a butyl group or the like. When $R^1$ is a fluoroalkyl group, the fluoroalkyl group may have about 1 to 6 carbons. When $R^1$ is an aryl group, the aryl group may be a phenyl group, a naphthyl group or the like, and may be optionally substituted with other group(s).

An organic group represented by $R^2$ in formulae (I), which is not specifically limited, may be exemplified as follows:

when m is 1, $R^2$ may be an alkyl group, a phenyl group or the like when m is 2, $R^2$ may be a linear-chain or branched alkylene group having 1 to 12 carbons, a linear-chain or branched poly(alkyleneoxy) group or the like when m is 3 or 4, $R^2$ may be an analogous poly-valent functional group or the like.

In formula (III), a monovalent inactive organic group represented by $R^3$ may be an alkylene group having 1 to 4 carbons. A functional group represented by $R^4$ which can be hydrolyzed may be an alkoxy group having 1 to 5 carbons, which includes a methoxy group, an ethoxy group and the like, and a halogen atom such as a chlorine atom and a bromine atom.

Among the above-described oxetane compounds, a compound having a silyl group in its molecule or in its hydrolyzed condensate has high affinity with a porous fine particle, and is preferably utilized in the present invention. In particular, a silsesquioxane compound (net-work-type polysiloxane compound) having a plural number of oxetanyl groups, which is a compound obtained by hydrolysis condensation of a compound represented by formula (III) in the presence of alkali and water, is one of oxetane compounds preferable for a material used in the present invention since the compound provides a hard coating.

An epoxy compound used in the present invention is a monomer which has at least one epoxy group in its molecule and is cured by a cationic polymerization. Examples of the epoxy compound may be a phenyl glycidyl ether, an ethylene glycol diglycidyl ether, a glycerin diglycidyl ether, a vinyl cyclohexenedioxide, a 1,2,8,9-diepoxy limonene, a 3,4-epoxycyclohexylmethyl-3',4'-epoxycyclohexane carboxylate, a bis (3,4-epoxycyclohexyl)adipate and the like.

As a cationic polymerization compound in the present invention, an oxetane compound is preferably utilized alone or in combination with an epoxy compound. When an oxetane compound and an epoxy compound are used in combination, the epoxy compound is preferably used in an amount of about 0 to 70 parts by weight, more preferably used in an amount of about 0 to 30 parts by weight, is more preferably used in an amount of about 1 part by weight to 20 parts by weight, based on 100 parts by weight of the oxetane compound. When the amount of the epoxy compound exceeds about 70% by weight based on the total amount of the oxetane compound and the epoxy compound, hardness of the resulting cured coating (obtained from the composition comprising the oxetane compound and the epoxy compound) tends to be lowered. However, when an epoxy compound is used together with an oxetane compound as cationic polymerization compounds in an appropriate amount as described above, curing of the oxetane compound is accelerated, which results in providing a coating which is harder than a film without the epoxy compound.

A porous fine particle in the present invention is not specifically limited, and may be a porous fine particle having an average diameter in a range of from about 5 nm to about 10 $\mu$m. In particular, a fine particle having an average diameter in a range of from about 5 nm to about 100 nm is more preferably used, when the resulting coating made from the composition comprising the fine particles is used as an anti-reflection film. Since a particle having a too small particle diameter is difficult to be industrially produced, such a particle is not suitable. On the other hand, a particle having a too large diameter is not preferred because the resulting coating tends to have insufficient optical performances such as lowered transparency.

Examples of the porous fine particle in the present invention include a silica fine particle and a silica-containing complex oxide fine particle. These porous fine particles are preferably utilized since the particles have a low refractive index and strength in themselves. A porous silica fine particle usually has a refractive index of from about 1.2 to about 1.45, which is lower than a refractive index of from 1.46 of the usual silica fine particle, and is therefore preferably used for providing an anti-reflection material. The porous silica fine particle in the present invention may have a refractive index of from 1.2 to 1.45, preferably of from 1.2 to 1.44, more preferably of from 1.2 to 1.42 and most preferably of from 1.25 to 1.40.

Examples of the porous silica fine particle include a silica having a highly entangled and branched structure like a polymer. Such a structure may be prepared in a method in which an alkoxysilane is hydrolyzed in the presence of an alkali, as shown in Japanese Laid-Open Patent Publication No. (JP-A-) 7-48527.

The above-described silica fine particle and silica-containing complex oxide fine particle both may have a core-shell (double) structure in which a core particle is coated with a shell layer. The core particle and coating layer may be mainly made from silica ($SiO_2$). The core particle may have a porous structure, while the shell layer may have a less porous structure than the core particle. Such a silica fine particle and a silica-containing complex oxide fine particle, both having the core-shell structure, can be obtained, for example, by the method described in JP-A-7-133105. Specifically, the particle with the core-shell structure may be manufactured in which an alkoxysilane such as tetraethoxysilane (i.e., ethyl silicate) and tetramethoxysilane (i.e., methyl silicate) is added together with water, an alcohol and a catalyst such as an alkali or an acid into a sol in which a porous silica fine particle is dispersed, to hydrolyze the alkoxysilane so that the surface of the porous silica fine particle is coated with the resulting hydrolyzed condensate.

The porous silica fine particle of which surface is coated to have a core-shell structure is preferably used since inlets of fine pores in the particle are blockaded and the porosity of the inside of the particle is maintained.

A composition comprising a cationic polymerization compound in the present invention may further contain a polymerization compound other than the cationic polymerization compound. For example, the composition may further comprise a multi-functional radical polymerization compound and/or a hydrolytic organic silicone compound.

A multi-functional radical polymerization compound in the present invention is a compound which has at least two polymerizing functional groups in its molecule and is cured by radical polymerization. Preferably, the multi-functional radical polymerization compound is a compound having at least two (meth)acryloyloxy groups in the molecule or the oligomer of the compound. Here, the term "(meth) acryloyloxy" represents both acryloyloxy and (meth) acryloyloxy, and hereinafter, the term "(meth)" (as in (meth) acrylic acid, a (meth)acrylate and the like) has an analogous meaning indicating the optional presence of a methyl substituent.

Examples of the multi-functional (meth)acryloyloxy compound include poly-valent alcohol poly(meth)acrylates such as ethylene glycol di(meth)acrylate, diethylene glycol di(meth)acrylate, 1,6-hexanediol di(meth)acrylate, neopentyl glycol di(meth)acrylate, trimethylolpropane tri(meth) acrylate, trimethylolethane tri(meth)acrylate, glycerin tri (meth)acrylate, pentaglycerol tri(meth)acrylate, pentaerythritol tri- or tetra-(meth)acrylate, dipentaerythritol tri-, tetra-, penta-, or hexa-(meth)acrylate and tris(meth) acryloyloxyethyl isocyanurate; phosphazene-based (meth) acrylate compounds in which a (meth)acryloyloxy group is introduced in a phosphazene ring of a cyclic phosphazene compound; urethane (meth)acrylate compounds which are obtained by reacting a polyisocyanate compound which has at least two isocyanate groups in its molecule with a compound in which partial hydroxy groups in a polyol is esterified with (meth)acrylic acid; polyester (meth)acrylate compounds which are obtained by reacting a carboxylic-acid halide compound which has at least two carbonyl groups in its molecule with a compound in which partial hydroxy groups in a polyol is esterified with (meth)acrylic acid, and the like. These compounds can be used alone, or can be used as a mixture of 2 or more kinds of them. Also, oligomers which are obtained by converting each of these compounds to a dimer, a trimer and the like may be used.

There are commercially available multi-functional (meth) acryloyloxy compounds, which may be used. Examples of the commercially available compounds include "NK ESTER A-TMM-3L" (pentaerythritol triacrylate manufactured by Shin-nakamura Chemical Co., Ltd.), "NK ESTER A-9530" (dipentaerythritol hexaacrylate manufactured by Shin-nakamura Chemical Co., Ltd.), "KAYARAD DPCA" (dipentaerythritol hexaacrylate manufactured by NIPPON KAYAKU Co., Ltd.), "ARONIX M-8560" (polyester acrylate compound manufactured by Toagosei Co., Ltd.), "NEW FRONTIER TEICA" (trisacryloyloxyethyl isocyanurate manufactured by Dai-ichi Kogyo Seiyaku Co., Ltd.), "PPZ" (phosphazene-based methacrylate compound manufactured by Kyoeisha Chemical Co., Ltd.), and the like. Further, commercially available products which are sold in a condition in which the multi-functional (meth)acryloyloxy compounds therein are mixed with solvents can be used in the present invention. Examples of such products include "ARONIX UV3701" (manufactured by Toagosei Co., Ltd.), "UNIDIC 17-813" (manufactured by Dainippon Ink & Chemicals incorporated), "NK HARD M-101" (manufactured by Shin-nakamura Chemical Co., Ltd.) and the like.

A hydrolytic organic silicone compound in the present invention is a compound having at least one hydrolytic group in its molecule in which an organic group is bonded with a silicon atom. Specifically, the hydrolytic organic silicone compound can be represented by formula (IV) below:

$$\mathrm{Si}(R^5)_q(R^6)_{4-q} \qquad\qquad (IV)$$

wherein $R^5$ represents a hydrogen atom or a monovalent inactive organic group, $R^6$ represents a hydrolyzable functional group, and q represents an integer of 0 to 3.

In formula (IV), the monovalent inactive organic group which is represented by $R^5$ may be an alkyl group having 1 to 4 carbons, an alkenyl group having 2 to 4 carbons, an aryl group including a phenyl or the like. The hydrolyzable functional group which is represented by $R^6$ may be an alkoxy group having 1 to 5 carbons including a methoxy group and an ethoxy group, an acyloxy group such as an acetoxy group and a propionyloxy group, a halogen atom such as a chlorine atom and a bromine atom, a substituted silyl amino group such as trimethylsilyl amino or the like. Well-known hydrolytic organic silicone compounds, which may be used in the present invention, can be classified into an alkoxy silane compound, a halogenated silane compound, an acyloxy silane compound, a silazane compound, and the like. These organic silicone compounds may have a substituent, as the portion of $R^5$ or $R^6$ in formula (IV), such as an aryl group, a vinyl group, an allyl group, a (meth) acryloyloxy group, an epoxy group, an amino group and a mercapto group.

Example of the hydrolytic organic silicone compound include halogenated silane compounds such as a methyltrichlorosilane; alkoxysilane compounds such as a tetramethoxysilane, a tetraethoxysilane, a methyltrimethoxysilane, a phenyltrimethoxysilane, a phenyltriethoxysilane, a dimethyldimethoxysilane, a dimethyldiethoxysilane, a vinyltrimethoxysilane, a vinyltriethoxysilane, a γ-aminopropyltriethoxysilane, an N-(β-aminoethyl)-γ-aminopropyltriethoxysilane, an N-(β-aminoethyl)-γ-aminopropylmethyldimethoxysilane, a γ-mercaptopropyltrimethoxysilane, a γ-mercaptopropylmethyldimethoxysilane, a γ-methacryloyloxypropyltrimethoxysilane, a γ-methacryloyloxypropylmethyldimethoxysilane, a γ-glycidoxypropyltrimethoxysilane and a γ-glycidoxypropylmethyldimethoxysilane; silazane compounds such as a hexamethyldisilazane, and the like. These can be used alone, or can be used as a mixture of 2 or more kindn of them.

The hydrolytic organic silicone compound may be a monomer as described above, an oligomer such as a compound having a polymerization degree of from 2 (a dimmer) to 10 (a decamer) or a multimer such as a polymer having a polymerization degree exceeding 10. Further, the hydrolytic organic silicone compound may be a hydrolyzed product which is obtained by hydrolyzing the above-mentioned organic silicone compound. The hydrolyzed product can be prepared by adding an acid such as a hydrochloric acid, a phosphoric acid and an acetic acid, or a base such as a sodium hydroxide and a sodium acetate into the above-mentioned organic silicone compound.

Also, the hydrolytic organic silicone compound may be a compound which has a fluorine atom in its molecule. The hydrolytic organic silicone compound having a fluorine atom in its molecule is a compound having at least one hydrolytic group in its molecule in which an organic group having a fluorine atom is bonded with a silicon atom. Specifically, such a hydrolytic organic silicone compound can be represented by formula (V) below:

$$\mathrm{Rf}-R^7-\mathrm{Si}(R^8)_r(R^9)_{3-r} \qquad\qquad (V)$$

wherein Rf is a linear chain or branched perfluoroalkyl group having 1 to 16 carbons, $R^7$ represents a divalent organic group, $R^8$ represents a hydrogen atom or a monovalent inactive organic group, $R^9$ represents a hydrolyzable functional organic group, and r represents an integer of 0 to 2.

In formula (V), $R^7$ is a divalent organic group, and specifically, may be the group as shown below:

—CH$_2$CH$_2$—,
—CH$_2$OCH$_2$CH$_2$CH$_2$—,
—CONHCH$_2$CH$_2$CH$_2$—,
—CONHCH$_2$CH$_2$NHCH$_2$CH$_2$CH$_2$—,
—SO$_2$NHCH$_2$CH$_2$CH$_2$—,
—CH$_2$CH$_2$OCONHCH$_2$CH$_2$CH$_2$—, and the like.

$R^8$ is a hydrogen atom or a monovalent inactive organic group, and specifically, is the sillier group as described for $R^5$ in formula (IV). $R^9$ is a hydrolyzable functional organic group, and specifically, is the sillier group as described for $R^6$ in formula (IV).

Examples of the hydrolytic organic silicone compound having a fluorine atom in its molecule which is shown in formula (V) include the following compounds:

CF$_3$CH$_2$CH$_2$Si(OCH$_3$)$_3$,
C$_4$F$_9$CH$_2$CH$_2$Si(OCH$_3$)$_3$,
C$_4$F$_9$CH$_2$CH$_2$Si(CH$_3$)(OCH$_3$)$_2$,
C$_8$F$_{17}$CH$_2$CH$_2$Si(OCH$_3$)$_3$,
C$_8$F$_{17}$CH$_2$CH$_2$Si(OC$_2$H$_5$)$_3$,
C$_8$F$_{17}$CH$_2$CH$_2$SiCl$_3$, $(CF_3)_2CF(CF_2)_8CH_2CH_2Si(OCH_3)_3$, $C_{10}F_{21}CH_2CH_2Si(OCH_3)_3$, $C_{10}F_{21}CH_2CH_2SiCl_3$, and the like.

The composition in the present invention, which comprises a cationic polymerization compound and a porous fine particle, may further contain a silicone oil. The silicone oil may be a commonly-used silicone oil. Examples of the silicone oil include a dimethylsilicone oil, a phenylmethylsilicone oil, an alkyl- or aralkyl-modified silicone oil, a fluorosilicone oil, a polyether modified silicone oil, a fatty acid ester modified silicone oil, a methylhydrogensilicone oil, a silanol-containing silicone oil, an alkoxy-containing silicone oil, a phenol-group-containing silicone oil, a methacryl modified silicone oil, an amino modified silicone oil, a carboxylic acid modified silicone oil, a carbinol modified silicone oil, an epoxy modified silicone oil, a mercapto modified silicone oil, a fluorosis modified silicone oil, a polyether modified silicone oil, and the like. These silicone oils may be used alone, or may be used as a mixture of 2 or more kinds of them.

By adding a silicone oil, leveling properties of the resulting cured coating is improved, and also, lubricity of the coating is improved, which results in providing a coating having hardness and scratch resistance higher than a film with no silicone oil. This improvement effect is shown more clearly especially when a silicone oil is used in a cured coating which is obtained from a composition comprising a oxetane compound as a cationic polymerization compound in the present invention, compared with an effect observed in an usual cured coating, for example, an effect of adding a silicone oil into a cured coating of a radical polymerization compound such as an acrylate-base compound. Moreover, in the present invention, a further higher effect of adding a silicone oil is obtained by using an oxetane compound and an epoxy compound in combination as a cationic polymerization compound.

In the composition comprising a cationic polymerization compound and a porous fine particle in the present invention, the amounts of the respective components are not specifically limited. For example, the amount of polymerization compound may be about 10% by weight to about 90% by weight and the amount of porous fine particle may be about 10% by weight to about 90% by weight, both based on the total amount of the polymerization compound and the porous fine particle. When a polymerization compound other than the cationic polymerization compound is contained, the amount of cationic polymerization compound may be about 10% by weight to about 70% by weight, the amount of the polymerization compound other than the cationic polymerization compound may be about 10% by weight to about 70% by weight and the amount of porous fine particle may be about 20% by weight to about 80% by weight, based on the total amount of the cationic polymerization compound, the polymerization compound other than the cationic polymerization compound and the porous fine particle.

When the amount of the polymerization compound is too small or too large based on the total amount of the polymerization compound and the porous fine particle, adhering properties of the resulting cured coating with a substrate tends to be lowered. Also, when the amount of porous fine particle is too small, adhering properties of the cured coating with a substrate tends to be lowered. In this case, a refractive index of the cured coating may not be lowered sufficiently, and therefore, it may be difficult to obtain a film with an adequate anti-reflection function. On the other hand, when the amount of porous fine particle is too large, the strength as a film may be lowered.

When a coating is formed as an anti-reflection film using a composition in the present invention, the kind of the porous fine particle, the addition amount and the like are appropriately selected so that the resulting formed (cured) coating may has a refractive index of from 1.2 to 1.45, preferably of from 1.25 to 1.41, and more preferably of from 1.30 to 1.40. In this case, the amount of porous fine particle to be added may vary depending on the refractive index of the porous fine particle to be used, and may be within the range as described above. More preferably, the amount of porous fine particle is about 15% by weight to about 70% by weight based on the total amount of the polymerization compound and the porous fine particle.

When a silicone oil exists in a composition in the present invention, it is preferred that the amount of the silicone oil is about 15 parts by weight or less based on the total amount of the polymerization compound and the porous fine particle in the composition. When the amount of the silicone oil is more than about 15 parts by weight, strength of the resulting coating made from the composition may be lowered, and optical properties of the film may be occasionally lowered, undesirably.

A substrate which may be used in the present invention is not specifically limited as long as the substrate is transparent. Examples of the substrate include a resin substrate such as a poly(methyl methacrylate) resin, a polycarbonate resin, a polystyrene, a methyl methacrylate-styrene copolymer resin, an acrylonitrile-styrene copolymer resin and a triacetylcellulose resin; a inorganic substrate such as an inorganic glass; and the like. In particular, a methyl methacrylate-styrene copolymer resin is suitable for the substrate of an anti-reflection film since the resin has little expansion and shrinkage by absorbing moisture.

The substrate may have flat surface and shape such as those of a plate, a sheet, a film and the like. Alternatively, the substrate may a shape of which surface has a curvature such as a convex lens and a concave lens. Onto the surface, fine unevenness may be provided. When the substrate is a resin substrate, a coating (such as a hard coat layer) other than the film in the present invention may be formed on the surface.

Before placing a composition in the present invention on a substrate, the composition may be adjusted to be a so-called paint (or coating) which contains the above-described respective components. In addition to the above-mentioned components, such a paint may contain a polymerization initiator, a catalyst, a solvent, various additives and the like, if necessary.

The polymerization initiator is used for curing a coating made from a composition in the present invention. The polymerization initiator is appropriately selected so that the polymerization initiator matches the polymerization mechanism of the respective polymerization compound in the composition. The polymerization initiator may be used alone, and most of the polymerization initiators can be used as a mixture of 2 or more kinds of them in combination.

The polymerization initiator for curing a cationic polymerization compound may be a compound which generates a cation by being irradiated with ultraviolet rays. Preferable examples of such an initiator include onium salts such as a diazonium salt, a sulfonium salt and an iodonium salt, which are represented by the following respective formulae:

$ArN_2^+ Z^-$, $(R)_3S^+ Z^-$, $(R)_2I^+ Z^-$ wherein Ar represents an aryl group, R represents an aryl group or an alkyl group having 1 to 20 carbons, and when R appears at a plural number of times in one molecule, the respective groups may be the same as or different from one another, and $Z^-$ represents a non-basic and non-nucleophilic anion.

In the above-mentioned respective formulae, the aryl group which is represented by Ar or R may be typically phenyl and naphthyl, and these may be substituted with an appropriate group. Examples of the anion which is represented by $Z^-$ may include a tetrafluoroborate ion ($BF_4^-$), a tetrakis(pentafluorophenyl)borate ion ($B(C_6F_5)_4^-$), a hexafluorophosphate ion ($PF_6^-$), a hexafluoroarsenate ion ($AsF_6^-$), a hexafluoroantimonate ion ($SbF_6^-$), a hexachloroantimonate ion ($SbCl_6^-$), a hydrogensulfuric acid ion ($HSO_4^-$), a perchloric acid ion ($ClO_4^-$), and the like.

Many of these polymerization initiators for a cationic polymerization compound are commercially available, and such commercially available polymerization initiators may be used in the present invention. Examples of the commercially available polymerization initiators for a cationic polymerization compound include "SYRACURE UVI-6990" (manufactured by The Dow Chemical Company Japan Co., Ltd.), "ADEKA OPTOMER SP-150" and "ADEKA OPTOMER SP-170" (both being manufactured by Asahi Denka Kogyo K. K.), "RHODORSIL PHOTOINITIATOR 2074" (manufactured by Rhodia Japan Co., Ltd.), and the like.

The polymerization initiator for a cationic polymerization compound is added in an amount of about 0.1 part by weight to about 20 parts by weight, and preferably in an amount of about 0.5 part by weight to about 10 parts by weight, based on 100 parts by weight of the cationic polymerization compound. When the amount of the polymerization initiator is too small, the ultraviolet polymerizability of the cationic polymerization compound may be exhibited, insufficiently. On the other hand, when the amount of the polymerization initiator is too large, the effect of increasing the amount is not confirmed, which is not economically advantageous, and there is a possibility of lowering optical properties of the resulting coating, undesirably.

As a polymerization initiator for a multi-functional radical polymerization compound, a compound which generates a radical by irradiation of ultraviolet rays is preferably used. Preferable examples of such a polymerization initiator include benzyls, benzophenones and derivatives thereof, thioxanthones, benzyldimethylketals, α-hydroxyalkylphenones, hydroxyketones, aminoalkylphenones, acylphosphineoxides and the like.

Many of these polymerization initiators for a multi-functional radical polymerization compound are commercially available, and the commercially available products can be used. Examples of the commercially available polymerization initiators for a multi-functional radical polymerization compound include "IRGACURE 651", "IRUGACURE 184", "IRUGACURE 907", "IRUGACURE 500", "DAROCURE 1173" and the like (sold by Ciba Specialty Chemicals Inc.), "KAYACURE BP-100", "KAYACURE DETX-S" and the like (sold by NIPPON KAYAKU Co., Ltd.), "HIGHCURE OBM" and the like (sold by kawaguchi chemical. Co., Ltd.), "QUANTACURE ITX" and the like (sold by Schell Kagaku K. K.), "LUCIRIN TPO" and the like (sold by BASF), and "ESACURE EB3" and the like (sold by Nihon Sieber Hegner K. K.).

The polymerization initiator for a radical polymerization is added in an amount of about 0.1 part by weight to about 20 parts by weight, and preferably in an amount of about 0.5 part by weight to about 10 parts by weight, based in 100 parts by weight of the multi-functional radical polymerization compound. When the amount of the polymerization initiator is too small, the ultraviolet polymerizability of the multi-functional radical polymerization compound is not adequately exhibited. On the other hand, when the amount of the polymerization initiator is too large, the effect of increasing the amount is not confirmed, which is not economically advantageous, and there is a possibility of lowering optical properties of the resulting coating, undesirably.

When a composition in the present invention contains a hydrolytic organic silicone compound, a curing catalyst such as an acid, an organometallic compound and a metal ion may be contained together in order to accelerate the curing of the hydrolytic organic silicone compound.

As described above, a composition in the present invention may be used together with a solvent and may be used as a paint (or a coating), which is also within the scope of the present invention.

The solvent is used for adjusting a concentration and viscosity of the paint, a thickness of the resulting cured coating, and the like. The solvent may be suitably selected. Examples of the solvent include alcohols such as methanol, ethanol, propanol, isopropanol, n-butanol, 2-butanol, isobutanol and tert-butanol; alkoxyalcohols such as 2-ethoxyethanol, 2-butoxyethanol, 3-methoxypropanol, 1-methoxy-2-propanol and 1-ethoxy-2-propanol; ketols such as diacetone alcohol; ketones such as acetone, methyl ethyl ketone and methyl isobutyl ketone; aromatic hydrocarbons such as toluene and xylene; esters such as ethyl acetate and butyl acetate; and the like. The amount of the solvent to be used is appropriately selected depending on the kind and shape of a substrate onto which the paint is applied, a method for coating the paint, a thickness of the objective coating and the like, and may be about 20 parts by weight to about 10,000 parts by weight based on 100 parts by weight of the total amount of the polymerization compound and the porous fine particle in the paint.

Further, additives such as a stabilizer, an antioxidant, a coloring agent and a leveling agent may be contained in the paint in the present invention. In particular, a silicone oil is preferably contained not only in a composition, but also in a paint, both of which are in the present invention. This is because, as described above, the silicone oil provides effects such that leveling properties, lubricity, hardness or the like of a cured coating which is obtained from the composition or the paint is improved. Examples of the silicone oil to be used here for a paint is the same as described above for a composition.

The amount of the silicone oil to be added to a paint is about 0 to about 20 parts by weight based on 100 parts by weight of the polymerization compound and the porous fine particle in the paint. When the amount of the silicone oil is more than about 20 parts by weight, the optical performance and strength of the resulting coating may be lowered, undesirably.

As described above, a coating comprising a composition in the present invention may be formed, for example, by in a method in which a paint which is prepared using the composition is applied onto a surface of a substrate. The application of a paint onto a substrate may be conducted in a commonly used method, such as a micro gravure coating method, a roll coating method, a dipping coating method, a float coating method, a spin coating method, a dye coating method, a cast coating method, and a spray coating method.

A composition or paint in the present invention, which is applied on a substrate, may be cured by ultraviolet-ray irradiation, heating or the like, to provide a coating in the present invention. When the composition or paint contains a solvent, the curing may be carried out as it is together with the solvent, or may be carried out after evaporating the solvent. When the solvent is evaporated, the evaporation may be conducted while the composition or paint may be maintained at room temperature, or may be dried by heating at a temperature of from about 30° C. to about 100° C. The period of time for drying is appropriately selected depending on the kind and shape of a substrate onto which the paint is applied, a method for coating the paint, a thickness of the objective coating and the like. When both of the curing by heating and the curing by ultraviolet-ray irradiation are carried out, either of the curings maybe carried out at first. Alternatively, the curing by heating can be carried out before and after the curing by ultraviolet-ray irradiation in a manner such that the heating curing, the ultraviolet-ray irradiation curing and another heating curing are carried out in this order.

In the curing of a coating by heating, the period of time and temperature for the heating are not specifically limited, and may be in the period of time for about one minute to about five hours at a temperature of from about 50° C. to about 120° C. When the coating contains a solvent, the curing by heating may be carried out as it is together with the solvent, or may be carried out after evaporating the solvent.

In the curing of a coating by ultraviolet-ray irradiation, the period of time and temperature for the irradiation is not specifically limited, and may be may be in the period of time for about 0.1 second to about 60 seconds under an atmosphere at a temperature of from about 10° C. to about 40° C. The irradiation energy of ultraviolet ray to be irradiated may be from about 50 mJ/cm$^2$ to about 3000 mJ/cm$^2$. When the irradiation amount of ultraviolet ray is too small, the curing may become inadequate, and strength of the resulting cured film may be lowered. On the other hand, when the irradiation amount of ultraviolet ray is too large, the coating and the substrate may be deteriorated, and there is a possibility that the optical properties and mechanical physical properties of the coating and the substrate are lowered.

Regardless of the previous heating curing, a heating curing may be conducted after the ultraviolet irradiation-ray curing, as described above. Such heating curing which is conducted after the ultraviolet irradiation-ray curing is not specifically limited, and may be conducted in the period of time for about 30 minute to about 24 hours at a temperature of from about 50° C. to about 120° C.

Thus obtained cured coating may have a thickness of from about 0.01 μm to about 20 μm, and preferably have a thickness of from about 0.01 μm to about 10 μm. When the film thickness is less than about 0.01 μm, characteristic as a cured coating tends to be hardly revealed. On the other hand, when the film thickness is larger than about 20 μm, there is a possibility that adhering properties of the film may be lowered, or crack and the like may be generated on the film, undesirably. In particular, when a coating is formed as an anti-reflection film, it is preferred that the film thickness is in the range of from about 0.01 μm to about 1 μm. When the film thickness is less than about 0.01 μm, or is more than about 1 μm, the function of the film as an anti-reflection film tends to be lowered.

A blending ratio of respective compounds contained in a composition in the present invention is not specifically limited. One of preferable examples of the composition is a composition in which a silica fine particle and either one of an oxetane compound having a silyl group in its molecule or a hydrolyzed condensate thereof are essentially contained and at least one of an epoxy compound and a silicone oil is also essentially contained. Such a composition may have a blending ratio of respective compounds in that 80% by weight to 100% by weight of at least one of an oxetane compound and a hydrolyzed condensate thereof as a cationic polymerization compound and 0 to 20% by weight of an epoxy compound as another cationic polymerization compound, based on the total amount of the cationic polymerizing. Further, the composition may have a blending ratio of respective compounds in that 5 parts by weight to 90 parts by weight of the total amount of the cationic polymerization compounds, 10 parts by weight to 80 parts by weight of the silica fine particle and 0 to 15 parts by weight of the silicone oil.

A composition in the present invention preferably contains either of an epoxy compound or a silicone oil or both of them as cationic polymerization compounds. In this case, the resulting cured coating tend to have particularly high hardness. More preferably, the compound has a blending ratio of respective compounds such that at least one of the epoxy compound and the silicone oil is contained in an amount of one part by weight or more based on 100 parts by weight of the total amount of the cationic polymerization compounds, the silica fine particle and the silicone oil. It is more effective that both of the epoxy compound and the silicone oil exist. In this case, it is preferred that the compound has a blending ratio of respective compounds such that the total amount of the epoxy compound and the silicone oil is one part by weight or more based on 100 parts by weight of the total amount of the cationic polymerization compounds, the silica fine particle and the silicone oil, as well.

A coating obtained from a composition in the present invention is superior in adhering properties to a substrate and is equipped with an adequate hardness. The coating acts as a surface functional layer. When the coating has an appropriate thickness and a refractive index, the film also works as an anti-reflection layer and is useful for a protective plate for a display and the like.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Applications Nos. 2001-347083 (filed on Nov. 13, 2001), 2001–347084 (filed on Nov. 13, 2001), 2002–068264 (filed on Mar. 13, 2002) and 2002-068265 (filed on Mar. 13, 2002), all indicating specification, claims, drawings and summary, are incorporated herein by reference in their entirety.

EXAMPLES

The present invention is described in more detail by reference to the following Examples, which should not be construed as a limitation upon the scope of the present invention.

In Examples, % and parts, both of which represent the content and the amount, are based on by weight unless otherwise mentioned. Further, films and substrates obtained in Examples were evaluated by methods below.
(1) Reflection Spectrum and Reflection Ratio A face which should be the counter side to the measurement area side of a substrate was roughed by a steel wool and was then coated with a black paint to be dried. An absolute mirror reflection spectrum at an incident degree of 50 to the substrate to be measured was obtained using an ultraviolet visible light spectrophotometer ("UV-3100" manufactured by Shimadzu Corporation). A wavelength at which a reflection ratio shows a minimum value and the minimum value of the reflection ratio were determined using the obtained reflection spectrum.

(2) Adhering Property

In accordance with the "checkers tape method" which is prescribed in JISK5400, the number of peelings per 100 checkers which had been provided at the surface of a film to be measured was counted. The peeling number is utilized for evaluating an adhering property of the film. The small number of the peelings means a high adhering property of the film.

(3) Scratch Resistance

The surface of a cured coating was rubbed several times by a hand using a gauze, and it was visually evaluated whether the surface was scratched or not.

Example 1A

A paint was obtained by mixing and dispersing 100 parts of a sol which had been obtained by dispersing a porous silica fine particles having a particle diameter of 20 nm to 70 nm of which surface was covered with a hydrolyzed polycondensate of ethyl silicate, in isopropyl alcohol at a concentration of 20%, 80 parts of oxetanyl silsesquioxane (which had been obtained from Toagosei Co. Inc.), which is a hydrolyzed polycondensate of 3-ethyl-3-[{3-(triethoxysilyl)propoxy}methyl]oxetane [i.e., a compound of $R^1$=ethyl, $R^4$=ethoxy, n=3 and p=0 in formula (III)] as an oxetane compound, 2.4 parts of a photo cationic polymerization initiator "RHODORSIL PHOTOINITIATOR 2074" [chemical name: p-cumyl-p-tolyliodonium tetrakis (pentafluorophenyl)borate, which had been obtained from Rhodia Japan Inc.], 4320 parts of isopropyl alcohol and 500 parts of 2-butoxyethanol.

A methyl methacrylate-styrene copolymer resin plate ["ACRYACE MS" manufactured by Japan Acryace Co.] containing a styrene unit of about 40% was immersed in the above-obtained paint, and a dipping coating method was carried out at a pulling-up speed of 18 cm/min. After drying at room temperature for one minute or more, the plate was further dried at 60° C. for 10 minutes. Then, ultraviolet rays was irradiated to the plate at an energy of about 2000 ml/cm$^2$ by a high pressure mercury lamp ("UVC 3533" manufactured by Ushio Electric Co., Ltd.), to obtain a laminated plate having an anti-reflection properties.

Figure 1:
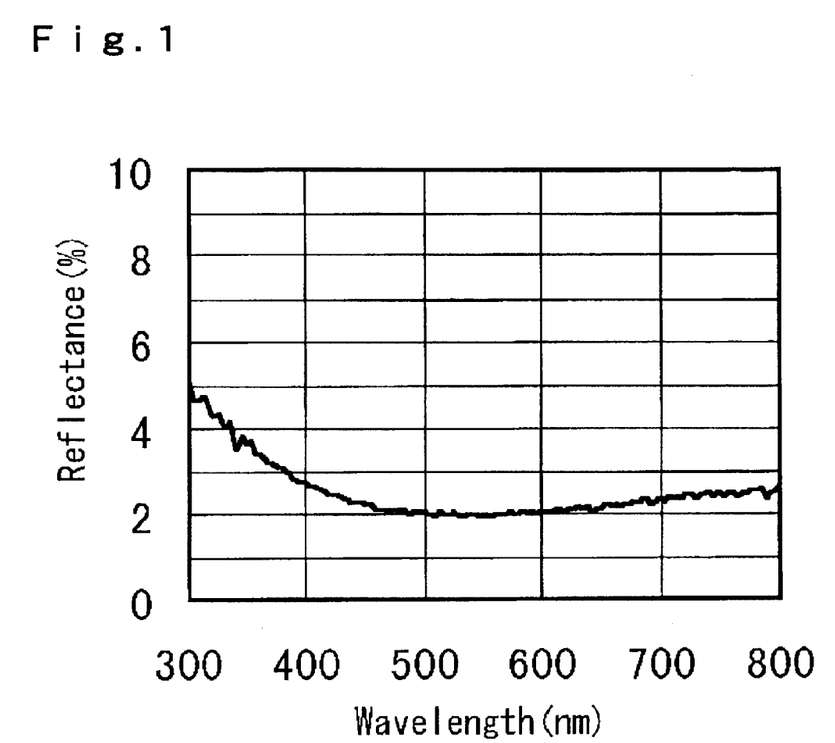
FIG. 1 to FIG. 4 represent reflection spectra of laminated plates (specifically, laminated plates obtained in Examples 1A to 3A and 2B) in the present invention.

The evaluation results of the laminated plate were shown in Table 1A. A reflection spectrum of the laminated plate was shown in FIG. 1. A refractive index and a thickness of the coating of the plate were calculated from the reflection spectrum. As a result, the refractive index was 1.42, and the film thickness was 97 nm.

Example 2A

A laminated plate having anti-reflection properties was prepared in the same manner as in Example 1A except that the compounds in the paint and blending ratios thereof were changed as follows.

| | |
|---|---|
| 20% Sol of the same porous silica fine particles as used in Example 1A | 175 parts |
| The same oxetanyl silsesquioxane as used in Example 1A | 65 parts |
| Initiator "RHODORSIL PHOTOINITIATOR 2074" | 1.9 parts |
| Isopropyl alcohol | 4,260 parts |
| 2-Butoxyethanol | 500 parts |

Figure 2:
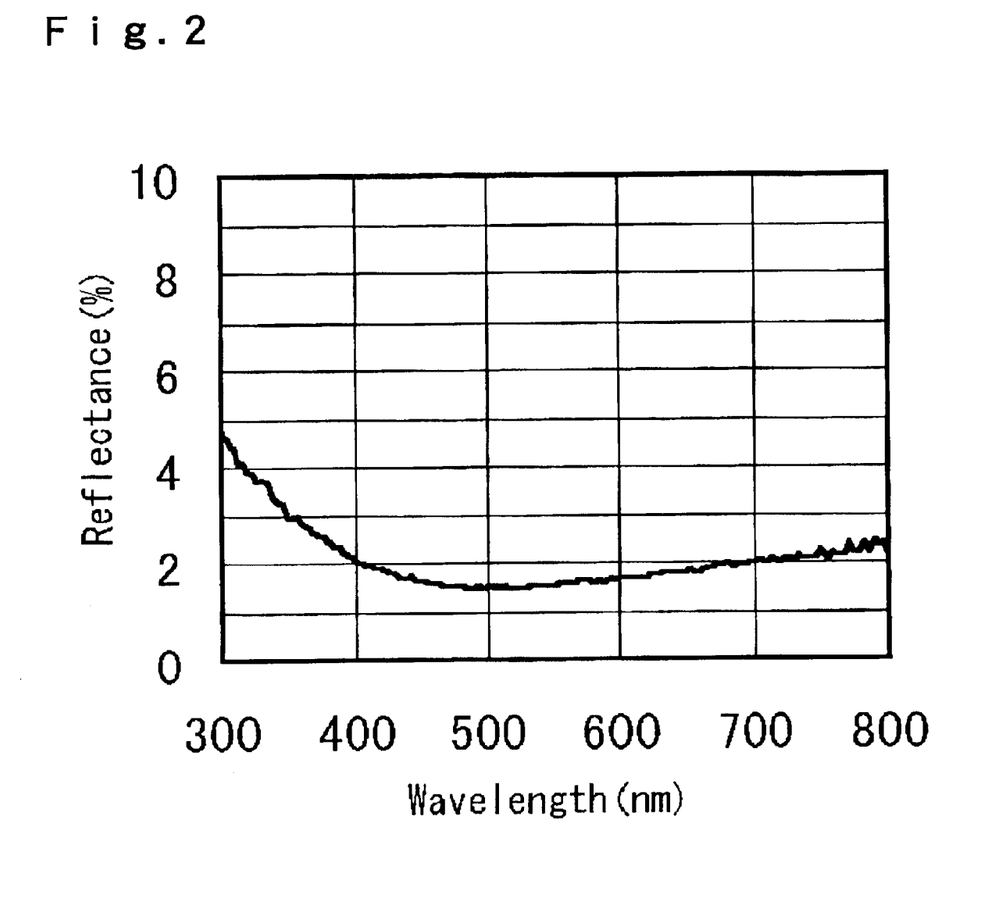

The evaluation results of the laminated plate were shown in Table 1A. A reflection spectrum of the laminated plate was shown in FIG. 2. A refractive index and a thickness of the coating of the plate were calculated from the reflection spectrum. As a result, the refractive index was 1.40, and the film thickness was 93 nm.

Example 3A

A laminated plate having anti-reflection properties was prepared in the same manner as in Example 1A except that the compounds in the paint and blending ratios thereof were changed as follows.

| | |
|---|---|
| 20% Sol of the same porous silica fine particle as used in Example 1A | 250 parts |
| The same oxetanyl silsesquioxane as used in Example 1A | 50 parts |
| Initiator "RHODORSIL PHOTOINITIATOR 2074" | 1.5 parts |
| Isopropyl alcohol | 4,200 parts |
| 2-Butoxyethanol | 500 parts |

Figure 3:
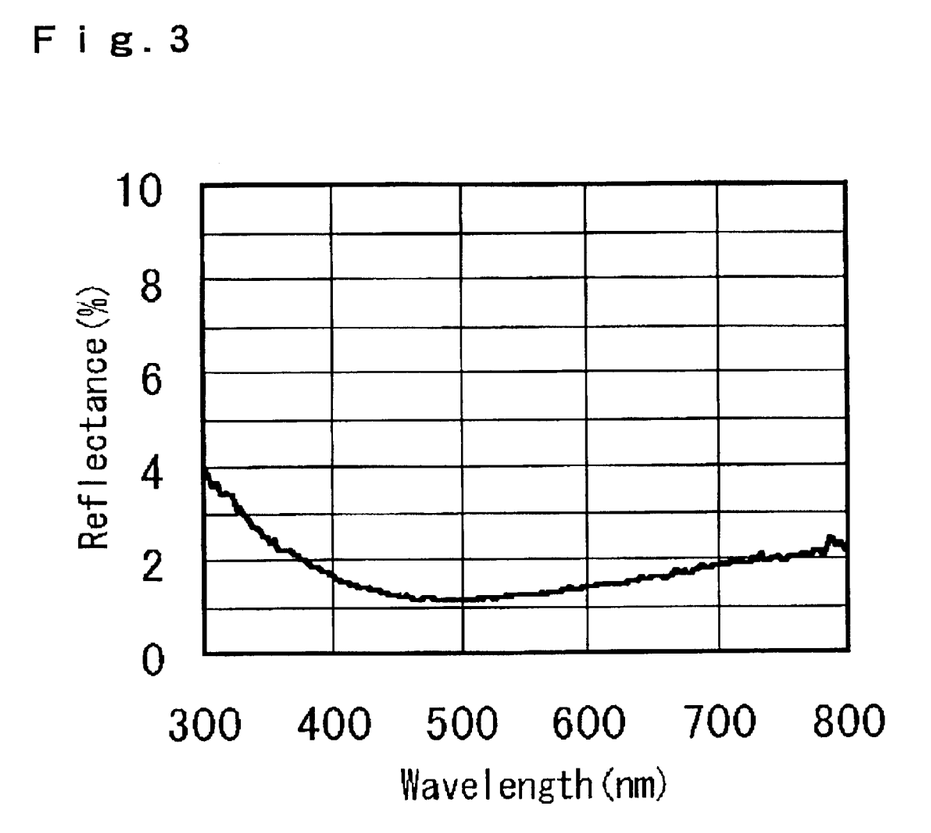

The evaluation results of the laminated plate were shown in Table 1A. A reflection spectrum of the laminated plate was shown in FIG. 3. A refractive index and a thickness of the coating of the plate were calculated from the reflection spectrum. As a result, the refractive index was 1.37, and the film thickness was 91 nm.

Comparative Example 1A

A paint was obtained by mixing and dispersing 100 parts of the same oxetanyl silsesquioxane as used in Example 1A, 3 parts of photo cationic polymerization initiator "RHODORSIL PHOTOINITIATOR 2074", 4400 parts of isopropyl alcohol and 500 parts of 2-butoxyethanol. Using thus obtained paint, a laminated plate having anti-reflection properties was prepared by the same method as in Example 1A.

The evaluation results of the laminated plate were shown in Table 1A. A refractive index and a thickness of the coating of the plate were calculated from the reflection spectrum. As a result, the refractive index was 1.47, and the film thickness was 119 nm.

Comparative Example 2A

A paint was obtained by mixing and dispersing 200 parts of a sol which had been obtained by dispersing a porous silica fine particles having a particle diameter of from 20 nm to 70 nm of which surface was covered with a hydrolyzed polycondensate of ethyl silicate, in isopropyl alcohol at a concentration of 20%, 75 parts of a hard coat agent ("NK HARD M-101" manufactured by Shin-nakamura Chemical Co., Ltd.) containing a urethane acrylate compound, 4225 parts of isopropyl alcohol and 500 parts of 2-butoxyethanol. Using thus obtained paint, a laminated plate having anti-reflection properties was prepared by the same method as in Example 1A.

The evaluation results of the laminated plate were shown in Table 1A. A refractive index and a thickness of the coating of the plate were calculated from the reflection spectrum. As a result, the refractive index was 1.41, and the film thickness was 89 nm.

TABLE 1A

| | Minimum reflection ratio | Wavelength showing minimum reflection ratio | Adhering property | Scratch resistance |
|---|---|---|---|---|
| Example 1A | 1.9% | 550 nm | 0/100 (No peeling) | No scratch |
| Example 2A | 1.5% | 520 nm | 0/100 (No peeling) | No scratch |
| Example 3A | 1.1% | 500 nm | 0/100 (No peeling) | No scratch |
| Comparative Example 1A | 3.1% | 700 nm | 100/100 (all peeled) | No scratch |
| Comparative Example 2A | 1.8% | 500 nm | 0/100 (No peeling) | Several scratches were observed |

Example 1B

A paint was prepared in the same manner as in Example 1A except that the compounds in the paint and blending ratios thereof were changed as follows, and further, 3 parts of 3,4-epoxycyclohexylmethyl-3',4'-epoxycyclohexane carboxylate was added thereto.

| | |
|---|---|
| 20% Sol of the same porous silica fine particles as used in Example 1A | 200 parts |
| The same oxetanyl silsesquioxane as used in Example 1A | 57 parts |
| Initiator "RHODORSIL PHOTOINITIATOR 2074" | 1.8 parts |

Using the paint, a laminated plate having anti-reflection properties was prepared by the same method as in Example 1A except that a pulling-up speed after immersing the copolymer resin plate into the paint was changed to 24 cm/min.

Figure 4:
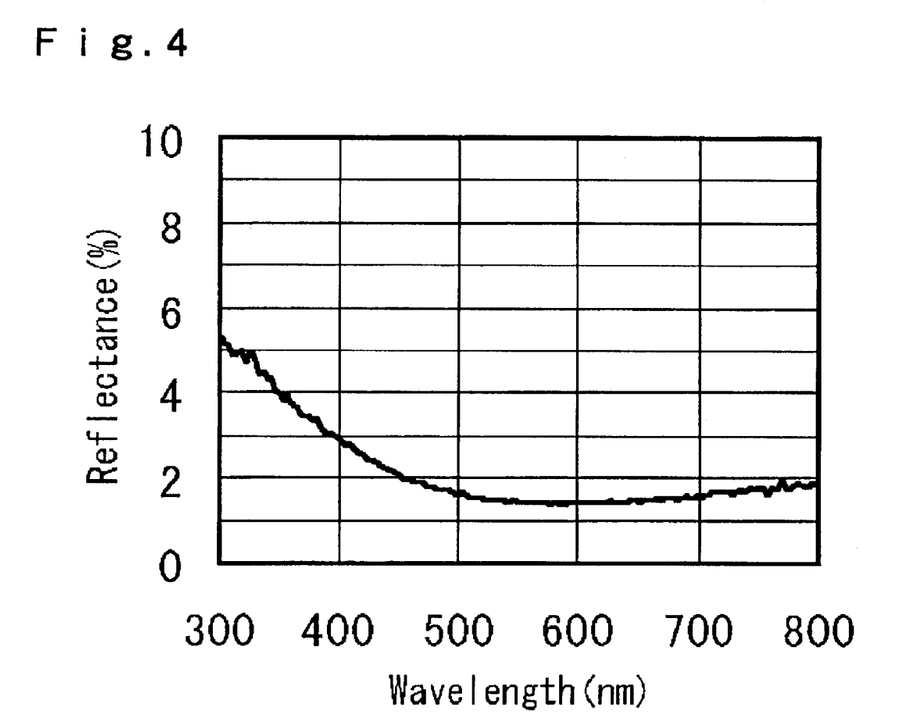

The evaluation results of the laminated plate were shown in Table 1B. A reflection spectrum of the laminated plate was shown in FIG. 4. A refractive index and a thickness of the coating of the plate were calculated from the reflection spectrum. As a result, the refractive index was 1.384, and the film thickness was 108 nm.

Example 2B

A laminated plate having anti-reflection properties was prepared in the same manner as in Example 1B except that the compounds in the paint and blending ratios thereof were changed as follows.

| | |
|---|---|
| 20% Sol of the same porous silica fine particles as used in Example 1B | 200 parts |
| The same oxetanyl silsesquioxane as used in Example 1B | 60 parts |
| Methylhydrogenesilicone oil "KF99" (manufactured by Shinetsu Chemical Co., Ltd.) | 2 parts |
| Initiator "RHODORSIL PHOTOINITIATOR 2074" | 1.8 parts |
| Isopropyl alcohol | 4,240 parts |
| 2-Butoxyethanol | 500 parts |

The evaluation results of the obtained laminated plate was shown in Table 1B. The anti-reflection properties of the laminated plate were equivalent to the laminated plate obtained in Example 1B.

Example 3B

A laminated plate having anti-reflection properties was prepared in the same manner as in Example 2B except that the amount of methylhydrogensilicone oil "KF99" was changed to 3 parts.

The evaluation results of the obtained laminated plate were shown in Table 1B. The anti-reflection properties of the laminated plate was equivalent to the laminated plate obtained in Example 1B. The scratch resistance of the laminated plate was improved in comparison with the laminated plate obtained in Example 2B.

Example 4B

A laminated plate having anti-reflection properties was prepared in the same manner as in Example 1B except that the compounds in the paint and blending ratios thereof were changed as follows.

| | |
|---|---|
| 20% Sol of the same porous silica fine particles as used in Example 1B | 200 parts |
| The same oxetanyl silsesquioxane as used in Example 1B | 57 parts |
| 3,4-epoxycyclohexylmethyl-3',4'-epoxycyclohexane carboxylate | 3 parts |
| Methylhydrogenesilicone oil "KF99" | 2 parts |
| Initiator "RHODORSIL PHOTOINITIATOR 2074" | 1.8 parts |
| Isopropyl alcohol | 4,240 parts |
| 2-Butoxyethanol | 500 parts |

The evaluation results of the obtained laminated plate were shown in Table 1B. The anti-reflection properties of the laminated plate was equivalent to the laminated plate obtained in Example 1B. The scratch resistance of the laminated plate was improved in comparison with the laminated plate obtained in Example 2B.

Example 5B

A transparent substrate having anti-reflection properties was prepared in the same manner as in Example 4B except that the amount of methylhydrogensilicone oil "KF99" was changed to 3 parts.

The evaluation results of the obtained laminated plate were shown in Table 1B. The anti-reflection properties of the laminated plate was equivalent to the laminated plate obtained in Example 1B. The scratch resistance of the laminated plate was improved in comparison with the laminated plate obtained in Example 3B.

Example 6B

A laminated plate having anti-reflection properties was prepared in the same manner as in Example 2B except that methylhydrogensilicone oil "KF99" was not added.

The evaluation result of the obtained laminated plate was shown in Table 1B. The anti-reflection properties of the laminated plate was equivalent to the laminated plate obtained in Example 1B.

Example 7B

A laminated plate having an anti-reflection properties was prepared in the same manner as in Example 2B except that the equal amount of bis[1-(3-ethyl-3-oxetanyl)methyl] ether having the structural formula which was described below:

was used in place of oxetanyl silsesquioxane, the amount of isopropyl alcohol was changed to 2800 parts and the amount of 2-butoxyethanol was changed to 340 parts.

The evaluation result of the obtained laminated plate was shown in Table 1B. The anti-reflection property was equivalent to that of Example 1B.

Comparative Example 1B

A laminated plate having anti-reflection properties was prepared in the same manner as in Example 2B except that 75 parts of a hard coat agent ("NK HARD M-101" manufactured by Shin-nakamura Chemical Co., Ltd.) containing a urethane acrylate compound was used in place of oxetanyl silsesquioxane and the amount of isopropanol was changed to 4225 parts. The evaluation result of the obtained laminated plate was shown in Table 1B. The hardness of the laminated plate was lower than the laminated plate obtained in Example 2B.

Comparative Example 2B

A laminated plate having an anti-reflection properties was prepared in the same manner as in Comparative Example 1B except that the amount of methylhydrogensilicone oil "KF99" was changed to 3 parts.

The evaluation result of the obtained laminated plate was shown in Table 1B. The evaluation result of the obtained laminated plate was shown in Table 1B. The hardness of the laminated plate was lower than the laminated plate obtained in Example 3B.

TABLE 1B

| | Adhering property |
|---|---|
| Example 1B | 0/100 (No peeling) |
| Example 2B | 0/100 (No peeling) |
| Example 3B | 0/100 (No peeling) |
| Example 4B | 0/100 (No peeling) |
| Example 5B | 0/100 (No peeling) |
| Example 6B | 0/100 (No peeling) |
| Example 7B | 0/100 (No peeling) |
| Comparative Example 1B | 0/100 (No peeling) |
| Comparative Example 2B | 0/100 (No peeling) |

Example 1C

A paint was prepared in the same manner as in Example 1A except that the compounds in the paint and blending ratios thereof were changed as follows:

| | |
|---|---|
| 20% Sol of the same porous silica fine particles as used in Example 1A | 80 parts |
| The same oxetanyl silsesquioxane as used in Example 1A | 19.4 parts |
| Initiator "RHODORSIL PHOTOINITIATOR 2074" | 1 part |
| Isopropyl alcohol | 1694.8 parts |
| 2-Butoxyethanol | 200 parts | and were further added to the paint 3.6 parts of dipentaerythritol hexaacrylate as a multi-functional polymerization compound, 0.2 part of a photo radical polymerization initiator "IRGACURE 907" (chemical name: 2-methyl-1-[4-(methylthio)phenyl]-2-morpholinopropan-1-on, obtained from Ciba Specialty Chemicals Inc.), 1.0 part of 3,4-epoxycyclohexylmethyl-3',4'-epoxycyclohexane carboxylate as an epoxy compound, and 1.0 part of methylhydrogensilicone oil "KF99" (manufactured by Shinetsu Chemical Co., Ltd.).

Using the thus prepared paint, a laminated plate having anti-reflection properties was prepared in the same manner as in Example 1A except that a pulling-up speed after immersing the copolymer resin plate into the paint was changed to 24 cm/min.

The evaluation results of the laminated plate were shown in Table 1C. A refractive index and a thickness of the coating of the plate were calculated from the reflection spectrum. As a result, the refractive index was 1.39, and the film thickness was 110 nm. The laminated plate had little coloring of reflected light caused by interference coloring.

Example 2C

A laminated plate having anti-reflection properties was prepared in the same manner as in Example 1C except that the compounds in the paint and blending ratios thereof were changed as follows.

| | |
|---|---|
| 20% Sol of the same porous silica fine particles as used in Example 1C | 100 parts |
| Multi-functional polymerization compound "NK HARD M-101"* | 7.5 parts |
| The same oxetane compound as used in Example 1C | 13.3 parts |
| The same epoxy compound as used in Example 1C | 0.7 part |
| The same photo cationic polymerization initiator as used in Example 1C | 0.7 part |
| The same silicone oil as used in Example 1C | 1.0 part |
| Isopropyl alcohol | 1676.8 parts |
| 2-Butoxyethanol | 200 parts |

*"NK HARD M-101": a solution (manufactured by Shin-nakamura Chemical Co., Ltd.) containing 80% of a multi-functional urethane acrylate oligomer and a photo radical polymerization initiator.

Chemical Co., Ltd.) containing 80% of a multi-functional urethane acrylate oligomer and a photo radical polymerization initiator.

The evaluation results of the laminated plate were shown in Table 1C. A refractive index and a thickness of the coating of the plate were calculated from the reflection spectrum. As a result, the refractive index was 1.38, and the film thickness was 106 nm. The laminated plate had little coloring of reflected light caused by interference coloring.

Comparative Example 1C

A laminated plate having anti-reflection properties was prepared in the same manner as in Example 1C except that the compounds in the paint and blending ratios thereof were changed as follows.

| | |
|---|---|
| 20% Sol of the same porous silica fine particle as used in Example 1C | 100 parts |
| The same "NK HARD M-101" as used in Example 2C | 25 parts |
| The same silicone oil as used in Example 1C | 1.0 part |
| Isopropyl alcohol | 1,674 parts |
| 2-Butoxyethanol | 200 parts |

The evaluation results of the laminated plate were shown in Table 1C. A refractive index and a thickness of the coating of the plate were calculated from the reflection spectrum. As a result, the refractive index was 1.40, and the film thickness was 112 nm.

TABLE 1C

| | Minimum reflection ratio | Wavelength showing minimum reflection ratio | Adhering property |
|---|---|---|---|
| Example 1C | 1.42% | 612 nm | 0/100 (No peeling) |
| Example 2C | 1.25% | 585 nm | 0/100 (No peeling) |
| Comparative Example 1C | 1.60% | 627 nm | 100/100 (All peeled) |

Example 1D

A paint was prepared in the same manner as in Example 1A except that the compounds in the paint and blending ratios thereof were changed as follows:

| | |
|---|---|
| 20% Sol of the same porous silica fine particles as used in Example 1A | 80 parts |
| The same oxetanyl silsesquioxane as used in Example 1A | 12 parts |
| Initiator "RHODORSIL PHOTOINITIATOR 2074" | 1.5 parts |
| Isopropyl alcohol | 1,681 parts |
| 2-Butoxyethanol | 200 parts | and were further added to the paint 12 parts of tetraethoxysilane as a hydrolytic organic silicone compound, 12 parts of 0.1N hydrochloric acid, and 1.5 parts of methylhydrogensilicone oil "KF99" (manufactured by Shinetsu Chemical Co., Ltd.).

Using the thus obtained paint, a laminated plate having anti-reflection properties was prepared in the same manner as in Example 1A except that a pulling-up speed after immersing the copolymer resin plate into the paint was changed to 24 cm/min and the drying condition was changed to a condition in which drying is carried out at room temperature for one minute or more and then at 60° C. for 10 minutes.

The evaluation results of the laminated plate were shown in Table 1D. A refractive index and a thickness of the coating of the plate were calculated from the reflection spectrum. As a result, the refractive index was 1.38, and the film thickness was 112 nm. The laminated plate had little coloring of reflected light caused by interference coloring.

Example 2D

A laminated plate having anti-reflection properties was prepared in the same manner as in Example 1D except that the compounds in the paint and blending ratios thereof were changed as follows.

| | |
|---|---|
| 20% Sol of the same porous silica fine particle as used in Example 1D | 120 parts |
| The same oxetane compound as used in Example 1D | 8 parts |
| The same photo cationic polymerization initiator as used in Example 1D | 1.5 parts |
| Tetraethoxysilane | 8 parts |
| 0.1 N hydrochloric acid | 8 parts |
| The same silicone oil as that in Example 1D | 1.5 parts |
| Isopropyl alcohol | 1653 parts |
| 2-Butoxyethanol | 200 parts |

The evaluation results of the laminated plate were shown in Table 1D. A refractive index and a thickness of the coating of the plate were calculated from the reflection spectrum. As a result, the refractive index was 1.34, and the film thickness was 108 nm. The laminated plate had little coloring of reflected light caused by interference coloring.

TABLE 1D

| | Minimum reflection ratio | Wavelength showing minimum reflection ratio |
|---|---|---|
| Example 1D | 1.27% | 620 nm |
| Example 2D | 0.63% | 580 nm |

What is claimed is:

1. A composition comprising a cationic polymerization compound and a porous line particle, wherein the cationic polymerization compound is selected from the group consisting of an oxetane compound and a mixture of an oxetane compound and an epoxy compound.

2. A composition according to claim 1, wherein the cationic polymerization compound is an oxetane compound.

3. A composition according to claim 1, wherein the porous fine particle is at least one fine particle selected from a group of a silica fine particle and a silica-containing complex oxide fine particle.

4. A composition according to claim 1, wherein the cationic polymerization compound is a mixture of an oxetane compound and an epoxy compound.

5. A composition according to claim 2 or 4, wherein the porous fine particle is at least one fine particle selected from a group of a silica fine particle and a silica-containing complex oxide fine particle.

6. A composition according to claim 5, wherein the oxetane compound is at least one compound selected from a group of an oxetane compound having a silyl group in its molecule and a decomposed condensate thereof.

7. A composition according to any one of claims 1 to 4, further comprising a polymerization compound other than the cationic polymerization compound.

8. A composition according to claim 7, wherein the polymerization compound other than the cationic polymerization compound is at least one compound selected from a group of a multi-functional radical polymerization compound and a hydrolytic organic silicone compound.

9. A composition according to claim 1, wherein the porous fine particle is at least one fine particle selected from a group of a silica fine particle and a silica-containing complex oxide fine particle, each of which has a core-shell in which a core particle is coated with a shell layer.

10. A composition according to any one of claims 1 to 4, further comprising a silicone oil.

11. A composition according to any one of claims 1, 3, and 4, wherein the composition comprises 5 parts by weight to 90 parts by weight of a cationic polymerization compound containing 80% by weight to 100% by weight of at least one compound selected from a group of an oxetane compound having a silyl group in its molecule and a hydrolyzed condensate thereof and 0 to 20% by weight of an epoxy compound, 10 parts by weight to 80 parts by weight of a porous fine particle, and 0 to 15 parts by weight of a silicone oil are contained, in which at least one of the epoxy compound and the silicone oil is contained in the composition.

12. A composition according to claim 11, wherein both of the epoxy compound and the silicone oil are contained in the composition, and the total amount of both is one part by weight or more based on 100 parts by weight of the total amount of the cationic polymerization compound, the porous fine particle and the silicone oil.

13. A composition according to claim 8, wherein the polymerization compound other than the cationic polymerization compound is a multi-functional radical polymerization compound.

14. A composition according to claim 13, wherein the multi-functional radical polymerization compound is at least one compound selected from a group of a compound which has at least two acryloyloxy group or methacryloyloxy group in its molecule and an oligomer thereof.

15. A coating obtained from the composition according to any one of claims 1 to 4.

16. A laminated plate comprising a substrate and a coating obtained from the composition according to any one of claims 1 to 4.

17. A laminated plate according to claim 16, wherein the coating obtained from said composition is placed onto a surface of the substrate.

18. A coating according to claim 15, wherein the coating has a refractive index of 1.2 to 1.45.

19. A coating according to claim 15, wherein the coating has a thickness of 0.01 μm to 1 μm.

20. A laminated plate according to claim 16, wherein the substrate is made from a methyl methacrylate-styrene copolymer resin.

21. A composition according to any one of claims 1 to 4, wherein the porous fine particle has a refractive index of 1.2 to 1.45.

22. A paint comprising a composition according to any one of claims 1 to 4 and a solvent.

23. A paint according to claim 22, further comprising a polymerization initiator.

24. A coating obtained from the composition according to claim 11.

25. A laminated plate comprising a substrate and a coating obtained from the composition according to claim 11.

26. A coating according to claim 18, wherein the coating has a thickness of 0.01 μm to 1 μm.

27. A coating according to claim 24, wherein the coating has a thickness of 0.01 μm to 1 μm.

28. A laminated plate according to claim 25, wherein the substrate is made from a methyl methacrylate-styrene copolymer resin.

* * * * *

UNITED STATES PATENT AND TRADEMARK OFFICE
CERTIFICATE OF CORRECTION

PATENT NO. : 6,743,510 B2
DATED : June 1, 2004
INVENTOR(S) : Shinsuke Ochiai It is certified that error appears in the above-identified patent and that said Letters Patent is hereby corrected as shown below:

Column 20,
Line 15, "line" should read -- fine --

Signed and Sealed this

Twenty-third Day of November, 2004

JON W. DUDAS
*Director of the United States Patent and Trademark Office*